(12) United States Patent
Viola et al.

(10) Patent No.: US 7,805,457 B1
(45) Date of Patent: Sep. 28, 2010

(54) SYSTEM AND METHOD FOR IDENTIFYING MEMBERS OF A GANG OR SECURITY THREAT GROUP

(75) Inventors: John J. Viola, Frisco, TX (US); James S. Sidler, Lubbock, TX (US); Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 402 days.

(21) Appl. No.: 12/031,460

(22) Filed: Feb. 14, 2008

(51) Int. Cl.
*G06F 17/30* (2006.01)
(52) U.S. Cl. .............................. 707/769; 707/E17.135
(58) Field of Classification Search ................ 707/802, 707/829, 769, 999.005, 999.1
See application file for complete search history.

(56) References Cited

U.S. PATENT DOCUMENTS

| | | | |
|---|---|---|---|
| 5,781,704 A * | 7/1998 | Rossno | |
| 6,072,860 A * | 6/2000 | Kek et al. | 379/88.25 |
| 6,173,284 B1 * | 1/2001 | Brown | |
| 6,437,696 B1 * | 8/2002 | Lemelson et al. | |
| 6,665,380 B1 * | 12/2003 | Cree et al. | 379/88.25 |
| 7,039,171 B2 * | 5/2006 | Gickler | |
| 7,085,359 B2 * | 8/2006 | Crites et al. | |
| 7,106,843 B1 * | 9/2006 | Gainsboro et al. | |
| 7,529,357 B1 * | 5/2009 | Rae et al. | |
| 7,584,480 B1 * | 9/2009 | Schwalenberg | |
| 2002/0107871 A1 * | 8/2002 | Wyzga et al. | |
| 2003/0070076 A1 * | 4/2003 | Michael | |
| 2005/0068169 A1 * | 3/2005 | Copley et al. | |
| 2005/0273453 A1 * | 12/2005 | Holloran | |
| 2009/0150442 A1 * | 6/2009 | Barnard et al. | |

* cited by examiner

*Primary Examiner*—Cheryl Lewis
(74) *Attorney, Agent, or Firm*—Fogarty, L.L.C.

(57) ABSTRACT

System and method for monitoring activity of detainees comprising identifying a detainee who is affiliated with a gang, searching one or more databases for information associated with the detainee, and correlating the information to identify individuals who may be affiliated with the gang. The databases may include call record databases, and the information associated with the detainee may include individuals called by the detainee, individuals who visit the detainee, telephone numbers called by the detainee, and sources of funding for the detainee's calls voice and/or facial biometric identifiers. An alert may be triggered when the detainee calls a specified individual or telephone number.

17 Claims, 8 Drawing Sheets

| SELECTED GANG MEMBER (601) | VISITORS (602) | DATE OF VISIT (603) | VISITS TO OTHER DETAINEES (604) | DATE OF VISIT TO OTHER DETAINEE (605) |
|---|---|---|---|---|
| PRISONER #1 | VISITOR #1 | 2/01/07 | PRISONER #2 | 2/01/07 |
| | | | PRISONER #3 | 2/15/07 |
| | | | INMATE #11 | 3/02/07 |
| | VISITOR #2 | 3/02/07 | PRISONER #3 | 2/01/07 |
| | | | PRISONER #4 | 2/15/07 |
| | | | INMATE #12 | 2/20/07 |
| | | | INMATE #13 | 2/20/07 |
| | | | INMATE #14 | 3/10/07 |
| | VISITOR #3 | 3/15/07 | PRISONER #3 | 3/01/07 |
| | | | PRISONER #5 | 3/15/07 |

FIG. 6

| SELECTED GANG MEMBER (701) | CALLED PARTY (702) | DATE OF CALL (703) | CALLS FROM OTHER DETAINEES (704) | DATE OF CALL FROM OTHER DETAINEE (705) |
|---|---|---|---|---|
| PRISONER #1 | VISITOR #1 | 2/01/07 | PRISONER #3 | 2/01/07 |
| | | | PRISONER #3 | 2/01/07 |
| | CALLED PARTY #1 | 2/02/07 | | |
| | | 3/01/07 | | |
| | | 3/20/07 | | |
| | CALLED PARTY #2 | 2/15/07 | | |
| | CALLED PARTY #3 | 3/04/07 | | |

| DETAINEE'S VISITORS | VISITS TO OTHER DETAINEES BY LEVEL 1 VISITORS | | | |
|---|---|---|---|---|
| VISITOR #1 | PRISONER #2 | CALLED PARTY #8 | VISITOR #7 | SOURCE #8 |
|  | PRISONER #3 | X | X | X |
|  | INMATE #11 |  |  | SOURCE #9 |
| VISITOR #2 | PRISONER #3 | X |  | X |
|  | PRISONER #4 |  |  | SOURCE #10 |
|  | INMATE #12 | CALLED PARTY #9 |  | SOURCE #11 |
|  | INMATE #13 |  | VISITOR #8 | SOURCE #12 |
|  | INMATE #14 |  | VISITOR #9 | SOURCE #13 |
| VISITOR #3 | PRISONER #3 | X | X | X |
|  | PRISONER #5 |  |  | SOURCE #14 |
| FUNDING SOURCES FOR DETAINEE | FUNDING TO OTHER DETAINEES BY LEVEL 1 SOURCES | | | |
| SOURCE #1 | INMATE #17 | CALLED PARTY #10 | VISITOR #10 | SOURCE #15 |
|  | INMATE #18 |  |  | SOURCE #16 |
| SOURCE #2 | PRISONER #3 | X | X | X |
|  | PRISONER #6 |  |  | SOURCE #17 |

FROM FIG. 8A

SYSTEM AND METHOD FOR IDENTIFYING MEMBERS OF A GANG OR SECURITY THREAT GROUP

TECHNICAL FIELD

The present invention relates generally to a system and method for monitoring, correlating and analyzing detainee records and, more particularly, to a system and method for identifying relationships to known gang members.

BACKGROUND

Many prisoners, inmates or other detainees are affiliated with a gang or security threat group. It is important to prison and jail management, wardens, and guards to know the gang affiliation of detainees to manage housing issues and to reduce conflict in the facility. Additionally, it would be helpful to investigators to identify other gang members to assist in crime investigations for inside and outside the facility walls. Currently, there is no system available to link data associated with known gang members to other individuals who may be affiliated with the gang.

SUMMARY OF THE INVENTION

These and other problems are generally solved or circumvented, and technical advantages are generally achieved, by embodiments of the present invention in which an investigator may identify known or suspected gang members and then link those gang members to their visitors, to individuals who provide funds to the gang members, to individuals who communicate with the gang members and to gang members who communicate with certain individuals. As used herein, the terms gang and security threat group are used broadly and are intended to include any known or suspected criminal, political, anti-social, anti-government, or terrorist organizations or groups of any size, including groups having local, national and/or international members and/or having centralized, decentralized, formal or informal management and control.

The present invention provides users with the capability to track, correlate and report on communication, visitation and funding activity of prisoners, inmates, and other detainees. Embodiments of the present invention provide for the integration of a plurality of databases and records stored on independent jail management, records management, call management, commissary services, and other systems. By searching across numerous independent databases and integrating the resulting data, the present invention allows users to map an individual's activity and to sort activity and relationships by gang affiliation, called party, visitors, funding party or other parameters. Embodiments of the present invention provide a system and method for sorting data to identify affiliations between an incarcerated persons and other known or potential gang members.

The present invention may be used to search across many independent and separate facilities and databases to detect patterns and commonality in relationships between gang members, detainees or other individuals. Additionally, conversations involving detainees' phone calls, messages, visitations or biometric data may be recorded and used as a source of information. One objection of the invention is to provide a system and method for effectively "connecting the dots" between people, activities, communications, and patterns. Data that is tagged with a gang affiliation notation may be linked to other directly or indirectly related data to identify other potential gang members. The data may be linked among individuals and records both within a facility and external to the facility as well as across multiple facilities.

Data in jail management software and applications may be used in embodiments to link known gang members to called numbers and called parties. Record associated with detainees having a known gang affiliation may be cross-referenced to other individuals using, for example, called numbers or call billing records. Additionally, visitation records may be used to link visitors to detainees with known gang affiliations, or to link detainees to visitors with known gang affiliations. In other embodiments, funding for detainee accounts, such as commissary accounts and calling card accounts and communication funding accounts, may be linked to detainees or funding sources having a known gang affiliation. If an inmate with a known gang affiliation receives funds from another individual (i.e. a funding event), the funding individual may be identified as having a potential gang affiliation. Embodiments of the present invention may also track the amount of funds involved in funding events, and/or the frequency of funding events.

Embodiments of the present invention provide integrated search capabilities that allow a user to cross reference inmate, call, visitor and transaction records against known gang members to identify other detainees, called parties, visitors and funding sources who may be gang members or supporters.

Additional databases that are not associated with a prison, jail or detention facility may also be searched, monitored or used in connection with the present invention. For example, records store in a court system, such as trial records, victim databases, witness lists, dockets, and other case information may be analyzed and correlated using the present invention. After an prisoner or detainee is released, additional data associated with the detainee may be collected, such as in a probation database. Embodiments of the invention include the capability to monitor and search information stored in such probation or post-incarceration databases.

In addition to identifying additional gang members, the present invention may be used to identify hierarchies within gangs and/or the organization of the gangs. Patterns detected using the present invention may be used to identify a detainee's rank within a gang.

Users also have the capability to review information correlated to a particular detainee, called number, billed number or other parameter. For example, a user may enter a billed telephone number and an investigation application would correlate and display all related information, such as the number times the telephone number was called, who called the number, when the number was called, where calls to the telephone number originated from, and who was called from the telephone number.

A user may use a rules-based engine to configure alert notifications. The user may select parameters to be monitored and, upon occurrence of the parameters, the rules-based engine may send an alert notifications to specified individuals or agencies. For example, a user may configure an alert to be notified when particular gang members contact each other, when particular accounts are used or replenished, or when particular telephone numbers are called. In one embodiment, the user may receive the alert notification in real-time, such as when a call is set-up between two known gang members or when a key word is spoken that would activate the notification. For example, if a detainee with a known gang affiliation calls another known gang member, an alert may be sent to an investigator. Upon receiving the alert, the user may listen-in, break-in, terminate or record the call or communication between the gang members.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention.

Figure 1:
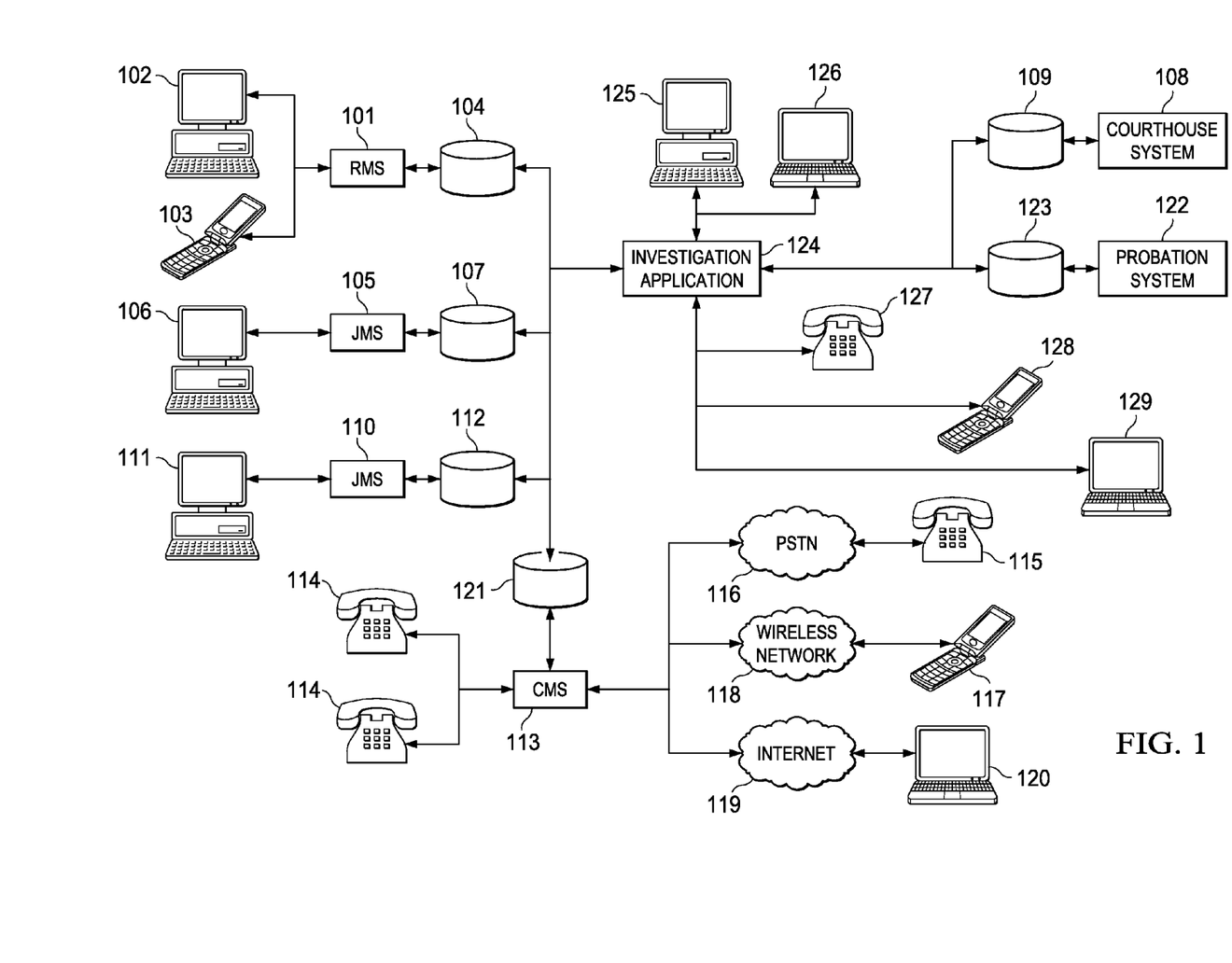
FIG. 1 illustrates systems used to identify gang or security threat group affiliation according to one embodiment of the invention.

FIG. 1 illustrates systems used to identify gang or security threat group affiliation according to one embodiment of the invention. Information related to individuals who are associated, directly or indirectly, with the criminal justice system, such as suspects, victims, witnesses, convicts, parolees, informants, investigators, guards, and their family, friends, and visitors, for example, may be stored in many different, independent systems and formats. Information associated with an individual who is arrested may be entered into records management system (RMS) 101 by a police officer, investigator, or detective. Information may be directly entered into RMS 101 at the time of arrest, or recorded on an arrest report and entered into RMS 101 at a later time, such as during or after booking RMS 101 may include, for example, arrest reports, incident reports, or other information associated with crime investigation and arrests.

The arrest reports stored in RMS 101 may include any relevant information, such as the information listed in Table 1, for example. Any additional relevant information may be included with or linked to the arrest report, such as pictures and biometric data, including but not limited to fingerprints and facial images. The arresting officer may enter the data into RMS 101 using data terminal 102, which may be linked directly to RMS 101 or remotely connected to RMS 101 via the Internet or any other public or private data network. The arresting officer may also enter data via wireless device 103, which may be a mobile data terminal, personal digital assistant (PDA), biometric scanner, handheld device, mobile phone, camera, or other such device. Device 103 may be a field identification device that can be used to record an individual's identification, point of entry, arrest or detention location, gang affiliation, and biometric data.

TABLE 1

Arrest/Incident Report

Arrestee's Name
Place/Date of Arrest/Incident
Height/Weight
Race
Gender
Date of Birth
Marks, Scars, Tattoos
Gang/Security Threat Group Affiliation
Description of Clothing
Description of Incident
Charges
Description of Evidence
Description/Identification of Other Arrestees It will be understood that the arrested or detained individual may be held under the control of any federal, state or local official working with any agency, such as, a sheriff's office, police department, Federal Bureau of Investigation (FBI), Department of Homeland Security (DHS), U.S. Citizenship and Immigration Services (USCIS), Immigration and Naturalization Service (INS), Border Patrol, or any other federal, state or local agency. The arrest records may be stored in RMS database 104 from which the records are available to RMS 101 and/or other systems.

When the arrested individual is transported to a jail, lockup, or other facility, additional information associated with the individual may be collected. If the arrested individual is held in jail after arrest and/or before trial, information about that individual may be entered into jail management system (JMS) 105. JMS 105 may be associated with a state or county jail, for example, that is used to hold inmates for relatively short periods of time after arrest and/or prior to a bond hearing or trial. In one embodiment, prisoner information is entered via a kiosk or stand-alone terminal, such as terminal 06 which may be used to enter inmate information during a booking or other process. The information entered into JMS 105 may include any relevant information, such as the information listed in Table 2, for example. Terminal, in-field hand-held unit or kiosk 106 may records a two-dimensional (2D) or three-dimensional (3D) image or series of images of the prisoner. Additionally, the visitor kiosk, in-field hand-held unit or terminal may record other biometric data, such as fingerprints, voice data, or speech samples.

JMS 105 may be used to classify and manage individual inmates by tracking individual inmate data, including identification information, such as height, weight, marks and scars, inmate health information, such as health history data, drug use, or suicide warnings. A booking officer or guard may also enter inmate data into JMS 105 based upon the officer's observations or the prisoner's answers to questions. For example, the guard may observe certain tattoos or clothing that indicates that the prisoner is a member of a gang or security threat group. Gang affiliation information may be used to prevent or limit members of the same or different gangs from interacting in the jail facility. The booking data may be linked to other records, such as an arrest record (Table 1). It will be understood that the information illustrated in Table 2 is merely exemplary and any additional information may also be included in the booking data entered in JMS 105, such as a voice print or speech sample, or a two-dimensional or three-dimensional image, mug shot, or picture of the individual.

TABLE 2

Inmate Booking Data

Inmate's Name
Date of Booking
Charges
Prior convictions/charges/arrests
Height/Weight
Race
Gender
Date of Birth
Marks, Scars, Tattoos
Fingerprints
Mug Shot/Pictures
Biometric Data
Assigned Cell
Identity of Cell Mates
Gang/Security Threat Group Affiliation
Description of Clothing
Description of Prisoner's Property Terminal 106 may be any fixed, mobile or portable data entry terminal, such as a personal computer, kiosk, PDA, or mobile data terminal, that is coupled to JMS 105 via a wired or wireless connection. Information entered into JMS 105, such as booking data (Table 2), may be stored in JMS database 107. Records and data stored database 107 may be available to JMS 105 and/or other systems.

Additional information related to arrested or detained individuals or inmates may be stored in courthouse computer system 108, which may be a docketing or case management software application, for example. Data associated with criminal trials, such as the information listed in Table 3 or similar documents or information, may be stored in database 109. Database 109 may be operated and maintained, for example, by a court clerk or a third party, such as the databases available on the Internet from LexisNexis®, CourtLink®, and Public Access to Court Electronic Records (PACER).

TABLE 3

Court Data

Defendant's Name
Charges
Judge
Trial Date
Trial Disposition
Sentence
Case Docket
Pleadings
Motions
Orders
Transcripts
Exhibits
Witness Lists
Prosecutor
Defense Counsel
Co-Defendants Individuals who are found guilty at trail and convicted of a crime may be assigned to a state or federal prison facility to serve their sentences. A jail management system, such as JMS 110 may be used at the prison facility to manage prisoners. Terminal 111 may be used to enter prisoner information during a prisoner booking or check-in process. Terminal 111 may be any fixed, mobile or portable data entry terminal, such as a personal computer, kiosk, PDA, or mobile data terminal, that is coupled to JMS 110 via a wired or wireless connection. Information entered into JMS 110, such as the example prisoner data listed in Table 4, may be stored in JMS database 112. Records and data stored database 112 may be available to JMS 110 and/or other systems. JMS 110 may be used to retrieve prisoner records from other facilities, such as by pulling an inmate record from database 107 for an individual that is transferred from one facility to another.

In one embodiment, prisoner information is entered via a kiosk, in-field hand-held unit, or stand-alone terminal, such as terminal 111, which records a two-dimensional (2D) or three-dimensional (3D) image or series of images of the prisoner. Additionally, the visitor kiosk, in-field hand-held unit, or terminal may record other biometric data, such as fingerprints, voice data, or speech samples. A guard or officer may also enter prisoner data into JMS 110 based upon the guard's observations or the prisoner's answers to questions, for example. The guard may observe certain tattoos or clothing that indicates that the prisoner is a member of a gang or security threat group. The prisoner may have been a gang-member outside of prison and may develop additional gang affiliations while in prison. In a preferred embodiment, any known or suspected gang or security threat group affiliation would be recorded for each prisoner to facilitate prison management and to reduce inter-gang conflict and interaction within the prison.

The information entered into JMS 110 may include any relevant information, and the records stored in database 112 may be linked to other records, such as an arrest record 104 or inmate record 107. It will be understood that the information illustrated in Table 4 is merely exemplary and any additional information may also be included in the prisoner data entered in JMS 110.

TABLE 4

Prisoner Data

Prisoner's Name
Crime/Conviction
Sentence
Prior convictions/charges/arrests
Dates Entering/Leaving Prison
Height/Weight
Race
Gender
Date of Birth
Marks, Scars, Tattoos
Fingerprints
Mug Shot/Images
Biometric Data
Assigned Cell
Identity of Cell Mates
Gang/Security Threat Group Affiliation
Description of Prisoner's Property When arrestees, inmates or prisoners are being held in a jail, prison, holding cell, lock-up or other restricted-access facility, they may have visitors. For example, the detained or incarcerated individual may be visited by lawyers, investigators, family members, and/or friends. In one embodiment, a jail management system, such as JMS 105 or 110, may be used to manage and facilitate inmate visitation. Visitors may need to pre-register or schedule their visits. This allows the warden, guards or prison operator to collect information about the visitor, such as name, address, and other identification information such as biometric identifiers. Alternatively, visitors may "walk-in" during visiting hours, but in that case the prison operator would collect identification information when the visitor arrives and before the visitor is allowed to meet with the prisoner. In one embodiment, visitors check-in or enter information into a kiosk or terminal, such as terminals 106 or 111, which records a two-dimensional (2D) or three-dimensional (3D) image or series of images of the visitor. Additionally, the visitor kiosk or terminal may record other biometric data, such as visitor fingerprints, voice data, or speech samples.

One example of the type of information that may be collected by the prison operator is shown in Table 5. It will be understood that this list is merely exemplary and is not intended to be an exhaustive list of information to be collected nor is it intended to list required information fields.

TABLE 5

Visitor Data

Visitor's Name
Name of Prisoner Visited
Dates of Visits
Address
Race
Gender
Date of Birth
Driver License Number/State
Social Security Number
Visitor Biometric Data/Images
Marks, Scars, Tattoos
Gang/Security Threat Group Affiliation
Relationship to Prisoner
Employer/Occupation
Visitor Criminal Record Data
Recording of Visitation
Transcription/Transliteration of Visitation The prison operator may use the visitor information to run a background check on the visitor before or during the visitation. Additional information may be added to the visitor's data, such as known or suspected gang affiliation, which may be based, for example, on the background-check information, a gang affiliation of the visited prisoner, or tattoos or clothing worn by the visitor. The visitor record data may be stored to a jail management system database, such as databases 107 or 112, or to a separate database. Additionally, the visitor record data may be associated with or linked to data files related to the prisoner. For example, the visitor data in Table 5 may be linked to inmate or prisoner data, such as Tables 2 and 4, for the visited prisoner.

Jails, prisons, holding cells, lock-ups or other restricted-access facilities often provide commissary services that allow prisoners or inmates to purchase food, tobacco products, toiletries, and other items. In order to use the commissary services, the prisoner, inmate or detainee must open and fund a commissary account. Typically, funds may be added to the commissary account by the detainee or by their lawyer, family members or friends. In one embodiment, a jail management system, such as JMS 105 or 110, may be used to manage the commissary services. Table 6 illustrates the type of data that may be used or monitored in a jail management system to operate commissary services. Commissary fund data for individual prisoners may be stored to a jail management system database, such as databases 107 or 112, or to a separate database. Additionally, the commissary fund data may be associated with or linked to data files related to the prisoner. For example, the commissary fund data in Table 6 may be linked to inmate, prisoner and/or depositor data, such as Tables 2 and 4.

TABLE 6

Commissary Data

Prisoner's Name
Balance
Deposit Amounts
r
Deposit Sources
Withdrawal Amounts
Withdrawal Dates
Items Purchased Prisoners typically have the capability to make telephone calls and may have the capability to receive voice messages and to send and receive text and/or email messages. Call management system (CMS) 113 may be used at a prison, jail, or other detention facility to provide telephone and/or messaging services to prisoners. In one embodiment, prisoners use a plurality of telephones 114, which are controlled by CMS 113, to make telephone calls to family, friends and other parties. CMS 113 is capable of routing calls to fixed, circuit-switched wireline telephones, such as home telephone 115, via public switched telephone network (PSTN) 116. CMS 113 may also route calls to wireless telephone 117 via wireless network 118. In other embodiments, CMS 113 may be capable of routing calls or other communications via packet-switched networks, such as Internet 119 or any public or private data network, to destination communication device 120. For example, CMS 113 may provide Voice over Internet Protocol (VoIP) communications between prison telephone 114 and destination device 120. It will be understood that destination device 120 may be a telephone, personal computer, laptop, personal digital assistant (PDA) or other device.

CMS 113 maintains a record of data for each communication between telephones 114 and other devices 115, 117, or 120. For example, CMS 113 may maintain Call Detail Records (CDRs) for calls or messages made to or from telephones 114. The CDR or other record may include information such as the fields illustrated in Table 7. A separate CDR may be created for every call or other communication. The CDR may identify the prisoner by name, account number or other identifier. The CDR preferably includes information to identify the source and destination of the call, such as a called and calling telephone number or IP address. For calls originated by prisoners, the particular telephone 114 used by the prisoner would be identified as well as the particular destination device 115, 117, or 120, for example. Additionally, the CDR may include call routing data that identifies PSTN, data, and wireless networks used during a call. The name or identity of the called or calling party, if it is not the prisoner, is also recorded.

Additionally, billing data, such as information used to pay for the call is also recorded. For example, the call may be paid for using collect call billing, a calling card account, prepaid account, a commissary account, or charges to the called or calling party's local exchange carrier (LEC). In some cases, the call may be recorded and a copy of the recording stored for real-time or later review and analysis. If the communication is a text or email message, a copy of the message may also be stored. The prisoner call data records may be stored, for example, to CMS database 121 or to any other database.

TABLE 7

Prisoner Call Data

Prisoner's Name
Source Identifier/Number
Destination Identifier/Number
Called/Calling Party
Call Routing Data
Billed-to Number
Collect Call Billing Data
Calling Card Account Data
Commissary Account Data
LEC Billing Data
Recording of Call
Transcription/Transliteration of Call
Copy of Text/Email Messages CMS 113 may be a stand-alone application or may operate in conjunction with a jail management system, such as JMS 105 or 110. Moreover, in embodiments of the invention, multiple jails, prisons, or other detention facilities may use the same jail management system. For example, JMS 105 and 110 may each serve a plurality of detention facilities and/or may represent a single jail management system being used at two different facilities. Accordingly, databases 107, 112 and 121 may be a single database or may be embodied as separate databases operating with separate systems.

When prisoners are released from prison, they may be placed on probation. Alternatively, instead of being sentenced to serve time in prison, a convicted defendant may be placed directly on probation following his trial. Officers in a probation department for the jurisdiction in which an individual is convicted typically monitor the individuals while they are on probation. The probation officers may use a software application, such as probation application 122, to facilitate monitoring of individuals on probation. The probation application allows officers to manage probation records, which may include data such as that illustrated in Table 8. The probation data record may include the terms of the individual's probation, such as beginning and ending dates and restrictions placed on the individual during the probation period. The record may also include information on the individual's address, telephone, relatives, friends, employer, and other contact information that would assist in monitoring or locating the individual. The probation data may also identify any gang or security threat group that the individual has been affiliated with, as well as any witnesses, or plaintiff's involved in any court cases involving the detainee either inside or outside of prison. Probation records may be stored in database 123 for access by probation application 122 or other systems.

TABLE 8

Probation Data

Name
Terms of Probation
Probation Start/End Dates
Restrictions During Probation Term
Employer
Address
Telephone Numbers
Criminal Record
Prison Record
Probation Officer Assigned to Case
Known Relatives/Friends/Associates
Gang or Security Threat Group Affiliation Investigation application 124 allows an investigator, such as an officer with a local, state or federal law enforcement agency, to analyze and investigate individuals who are associated, directly or indirectly, with a gang or security threat group. Investigation application 124 may be coupled to RMS database 104, JMS databases 107 and 112, call record database 121, courthouse database 109, and probation service database 123. Investigation application 124 allows the investigator to search these databases for information associated with gangs and security threat groups. An investigator may access investigation application 124 using terminals 125 and 126, which may be a personal computer, cell phone, PDA, handheld device or lap top computer, for example.

Investigation application 124 may run on any processor-based system, such as a personal computer or server, for example, that is capable of communicating with external networks and databases and processing data associated with records such as those described herein. Investigation application 124 may run on a server that is coupled to multiple systems and databases, such as those illustrated in FIG. 1. Investigation application 124 may communicate with other systems, databases, or applications via any public or private data network, such as an Internet, intranet, extranet, or wide or local area network (WAN/LAN). In one embodiment, users may communicate with investigation application 124 via a local or remote personal computer (PC), laptop computer, or terminal, such as devices 125, 126 or 129. Alternatively, a server running application 124 may communicate with users via wireless device 128 or a wireline connection, such as telephone 127, using, for example, voice signals, an interactive voice response (IVR), a voice response unit (VRU), or dual tone multi-frequency (DTMF) tones.

Investigation application 124 allows the investigator to track and correlate information available from arrest records, jail records, courthouse and probation records to monitor communication, visitation and funding activity associated with members of gangs or security threat groups. The investigator may use investigation application 124 to map an individual's activity and to sort that activity by gang affiliation. By extension, this mapping may include information regarding called parties, visitors, individuals providing funding to an inmate, and individuals having other interaction with the inmate or prisoner, who may be affiliated to the incarcerated person and possibly affiliated with the gang as well. Investigation application 124 may be used to search across many facilities to identify patterns associated with different individuals that may be linked to the same gang or security threat group. Recorded conversations from phone calls, messages, emails, or prisoner visitation may also be a source of information. In one embodiment, investigation application is used to "connect the dots" between people, activity, communications and patterns to identify other potential gang members.

It will be understood that this invention is not limited to use with data from jails or prisons, but may be used with any other fixed or mobile holding, detention, controlled-environment or limited-access facilities or checkpoints, without limitation, such as inmate facilities (e.g., municipal jails, county jails, state prisons, federal prisons, military stockades, juvenile facilities, and detention camps), hospitals, nursing homes, camps, boot camps, border crossings, immigration checkpoints, point of entry, roadblocks and mobile law enforcement vehicles and facilities. Additionally, it will be understood that the present invention is not limited to use with data from a single law enforcement agency, but may be used to simultaneously review and analyze data from unrelated local, state, federal and international law enforcement agencies as well as other government, public and private agencies and entities. Jail and prison facilities may be run by a government agency or by private or public companies. Additionally, calling services and commissary services provided in a jail or prison may be provided by a government agency or by private or public companies. In some embodiments of the present invention, data and information from separate and independent facilities, government agencies, and public and private companies is available to an investigation application, such as a gang or security threat group affiliation system.

It will be understood that, in addition to the information illustrated in the fields of Tables 1-8, any other information may be included in the records available to the investigation application. For example, an individual's citizenship, country of residence, origin, or point of entry may be included in one or more records.

Figure 2A:
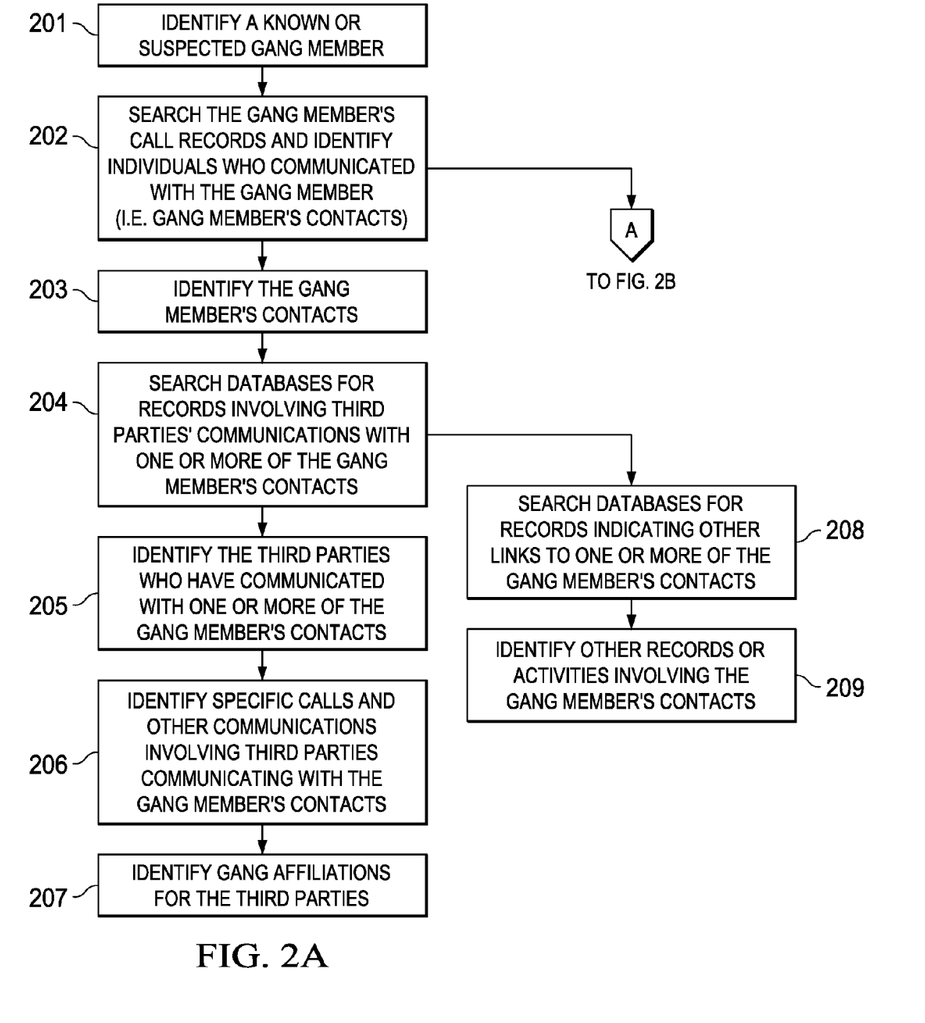
FIGS. 2A and 2B illustrate a flowchart for an exemplary embodiment of a method for tracking, correlating, and reporting on communication and links between gang members and other individuals.
Figure 2B:
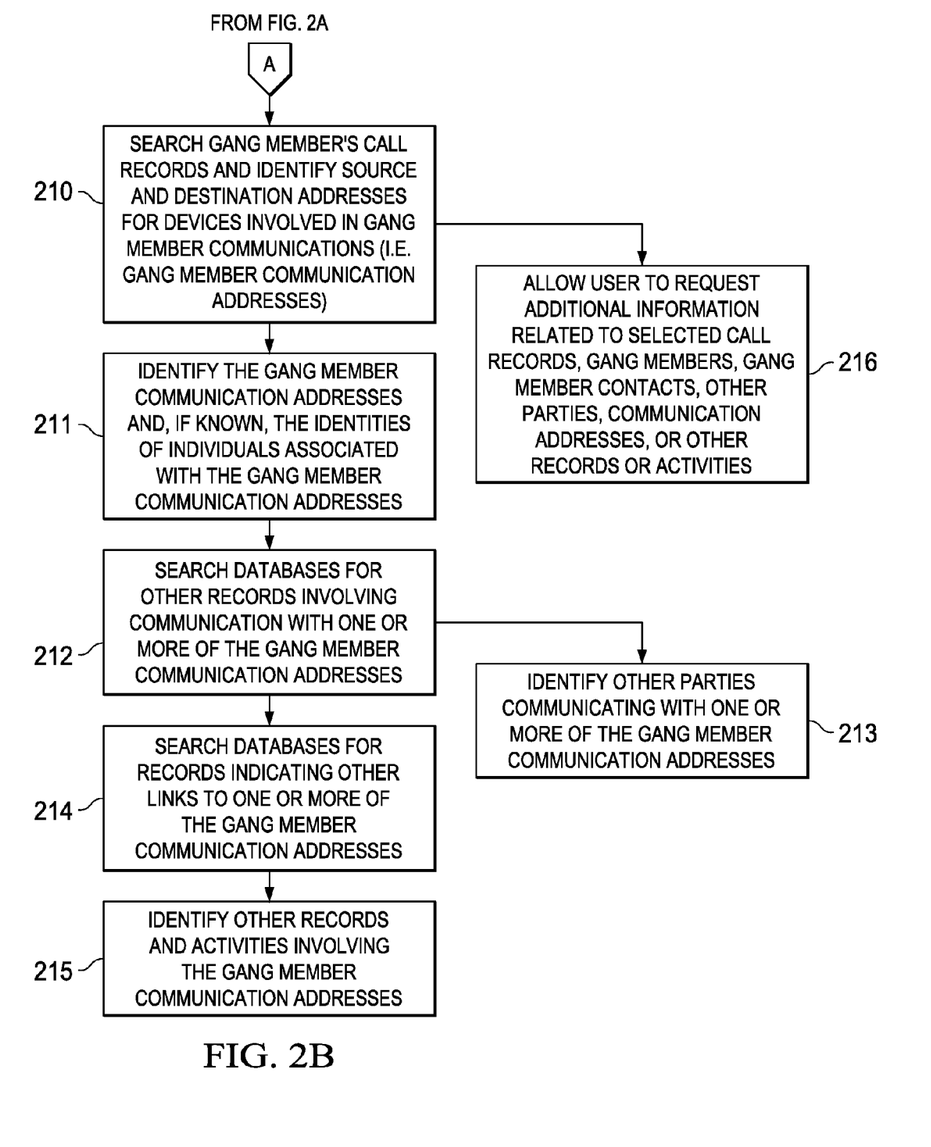

FIGS. 2A and 2B illustrate a flowchart for an exemplary embodiment of a method for tracking, correlating, and reporting on communication and links between gang members and other individuals. The method illustrated in FIGS. 2A and 2B may be implemented, for example, using investigation application 124 (FIG. 1), but is not intended to be limited to such configurations. Moreover, it will be understood that the steps illustrated in FIGS. 2A and 2B may be performed in the order indicated, or in any other order, or simultaneously, or in conjunction with other steps or methods.

In step 201, a user, such as an investigator, identifies a known or suspected gang member. In step 202, the investigation application search the gang member's call records and identifies individuals who have communicated with the gang member. In step 203, the gang member's contacts are identified to the user. In one embodiment, the list of gang member's contacts may be identified to the user on a display, such as a report displayed on a graphical user interface (GUI) on terminals 125 or 126. The gang member's contacts include all individuals who can be identified from the gang member's call records as having been in contact with the gang member. For example, call data records for the gang member, such as the call record illustrated in Table 7, may be searched may be searched on CMS database 121. Information identifying parties who were called by the gang member (i.e. called party) or parties who called the gang member (i.e. calling party) is collected from the call record.

In step 204, databases are searched for records reflecting other parties' communications with one or more of the gang member's contacts. For example, the databases may be searched using the gang member contact list (e.g., the list of called and calling parties from the gang members call data records) to find other records that show communications between the gang member's contacts and individuals other than the gang member (third parties). In step 205, the third parties who have communicated with one or more of the gang member's contacts are identified. These third parties may be identified by displaying them in a list or report on a GUI display for the user. The third parties may not be in direct contact with the gang member, but they are only one step or link removed from the gang member. The third parties may be connected to the same groups as the gang member or to related groups. The identity of the third parties are not readily apparent to the investigator from the gang member's call records, but must be identified by linking information from the call records to other records.

The user may select which databases should be searched to identify the third parties. In one embodiment, any of the databases discussed in connection with FIG. 1 may be selected for searching. Typically, call detail record (CDR) databases, such as CMS database 121 would be selected; however, if CDR or call data is also stored in RMS database 104, JMS databases 107 or 112, or other databases, then those databases may also be selected for third-party searching.

In step 206, specific calls and other communications involving the third parties' communications with the gang member's contacts are identified. In one embodiment, a report or list of such call information may be displayed to the user on a GUI, for example. In step 207, gang affiliations for the third parties are also identified to the user. It will be understood that the CDRs, call data, and communications searched in the selected databases are not limited to telephone calls. Records associated with other voice communications, such as voicemail, electronic communications, such as email and text messages, and hard copy communications, such as mail carried by the U.S. Postal Service or other private carriers, may also be analyzed using the list of gang member's contacts to identify the third parties. After step 207, the process may move to step 208, 216, or any other point in the flowchart.

Although not illustrated in FIGS. 2A and 2B, it will be understood that the list of third parties may be used to search the selected databases to identify communications with additional parties (e.g. fourth parties) that are one more step or link removed from the gang member. Additional levels of searching may be conducted with the fourth parties' names to identify fifth parties that are further removed and so on. Multiple levels of search results, such as the names of the gang member's contacts and the third, fourth, etc. parties, may be displayed and/or sorted for the user. In one embodiment, multi-level search results are sorted by number of communications (e.g. number of calls, emails, or text messages), the number of unique parties each individual communicates with, gang affiliation, criminal record factors, location, or any other parameter.

The initial list of gang member's contacts identified in step 203 is determined by the call record search in step 202. Steps 204-207 involve further searching of call record searching using the initial gang member's contact list. In step 208, other databases are searched for records indicating other links to one or more of the gang member's contacts. For example, court data, visitor data, commissary data, or probation data, such as that stored in databases 107, 112, 109, and 123 and illustrated in Tables 3, 5, 6, and 8, may be searched for connections, relationships or links to the gang member's contacts. In step 209, the other records or activities involving the gang member's contacts are identified. For example, if records are found in step 208 that indicate that a gang member's contact visited another inmate, funded a commissary account, paid for a prisoner phone call, had a probation record or other record of interest, then that record or activity is displayed to the user in step 209. After step 209, the process may move to step 210, 216 or any other point in the flowchart.

As noted above with respect to further searching of the call records, it will be understood that the list other activities or records may be used for additional rounds of searches of selected databases to identify connections to additional parties (e.g. third, fourth, fifth parties, etc.) that are one more step or link removed from the gang member.

In step 210, instead of identifying individuals from the gang member's call records, the gang member's call records are searched to identify source and destination addresses for devices involved in gang member communications. For example, telephone numbers, Internet Protocol (IP) addresses, email addresses, street addresses, or other source and destination data may be identified. These addresses correspond, for example, to telephones, wireless devices, email accounts, computers, and other devices that were involved in communications with the gang member. In step 211, the communication addresses are identified, such as a list of telephone numbers called by the gang member. The identities of individuals associated with these communication addresses may also be identified in step 211, such as by displaying the addresses and names in a list or report on a GUI.

In step 212, selected databases are searched to find other records involving communication with one or more of the communication addresses. In step 213, the parties communicating with one or more of the communication addresses are identified. For example, steps 212 and 213 would identify other individuals who communicated with the same telephones, wireless devices, computers or other communication devices as the gang member. After step 213, the process may move to step 214, 216 or any other point in the flowchart.

In step 214, selected databases are searched for records indicating other links to one or more of the communication addresses. Similar to step 208, step 214 detects connections or links between other, non-communication parameters, such as visitor, commissary, or probation records, and the communications addresses. In step 215, the other records and activities involving the addresses are identified. After step 215, the process may move to step 216 or any other point in the flowchart.

In step 216, the user may request additional information related to selected call records, gang members, gang member contacts, other parties, communication addresses, time and date of communication or other records or activities. For example, when an individual is identified as a having a "third party" connection to a gang member, the user may select that individual for additional searching. In step 216, all information associated with the selected individual may be displayed to the user. The additional information may be pulled from all or selected ones of the available databases. After step 216, the process may repeated step 216, move to step 201 or any other point in the flowchart.

Figure 3:
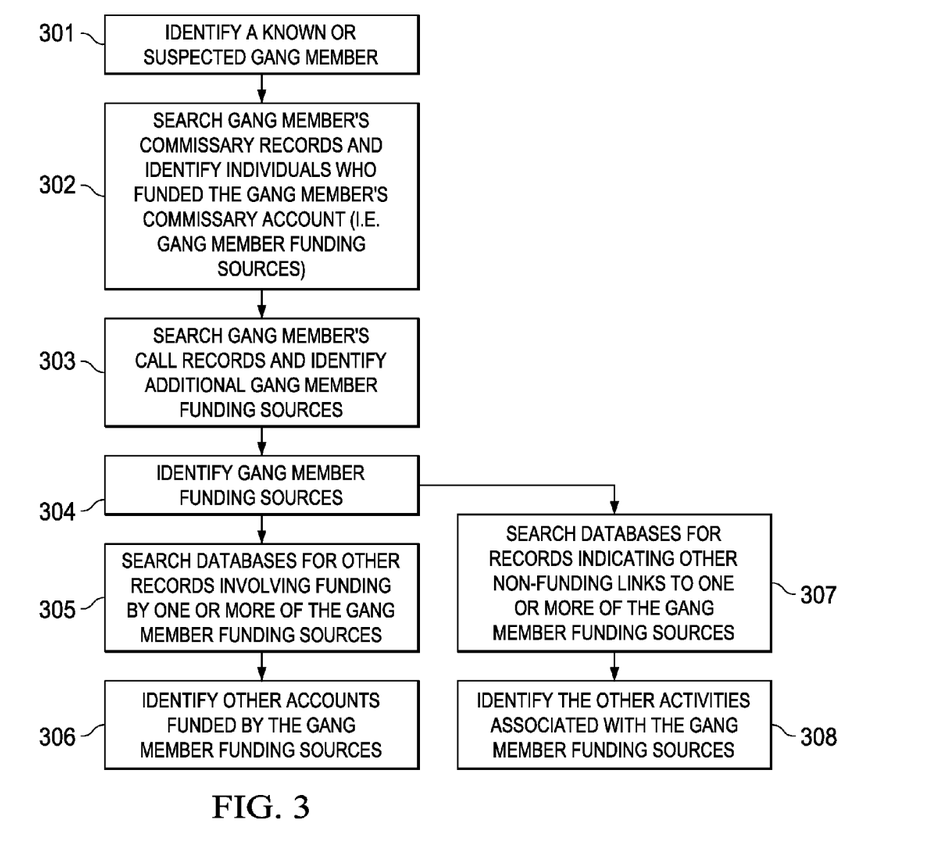
FIG. 3 illustrates a flowchart for another exemplary embodiment of a method for tracking, correlating, and reporting on communication and links between gang members and other individuals, such as common funding sources.

FIG. 3 illustrates a flowchart for another exemplary embodiment of a method for tracking, correlating, and reporting on communication and links between gang members and other individuals, such as common funding sources. The method illustrated in FIG. 3 may be implemented, for example, using investigation application 124 (FIG. 1), but is not intended to be limited to such configurations. Moreover, it will be understood that the steps illustrated in FIG. 3 may be performed in the order indicated, or in any other order, or simultaneously, or in conjunction with other steps or methods. In step 301, a known or suspected gang member is identified or selected by the user. In step 302, that selected gang member's commissary records are searched and individuals who funded the gang member's commissary account (i.e. gang member funding sources) are identified. The funding sources may include, for example, any individual or entity who deposited funds, added money, or provided credit to or for the gang member commissary account. Inmates and prisoners often receive commissary funds from family members, but they may also receive funds from fellow gang members.

In step 303, the gang member's call records are searched to identify additional gang member funding sources. In addition to requiring commissary funds, the inmate or prisoners may require funding, such as calling cards, for calling services. In step 303, any source of funding for communications are identified, if possible, such as individuals who accepted collect calls from the gang member, individuals who added money to the gang member's calling card, individuals who own a telephone number that was billed for calls (billed-to number or BTN).

In step 304, all gang member funding sources found in steps 302 and 303 are identified to the user. For example, a list or report of individual who provided funding to the gang member may be displayed on a GUI to the user on a terminal, such as 125 or 126. After step 304, the process may move to either step 305 or 307 or both.

In step 305, selected databases are searched for other records involving funding by one or more of the gang member funding sources. For example, any database or record that may include funding data, such as any commissary records, call detail records, or the like, are searched in step 305. In step 306, the other accounts or records that indicate funding by the gang member's funding sources are identified. These other accounts may not be associated with the gang member, but if funded by the same sources, these accounts may provide leads to an investigator to identify other gang members. After step 306, the process may move to step 307 or any other point in the flowchart.

In step 307, selected databases are searched for other records indicating non-funding links to one or more of the gang member funding sources. For example, call records may be searched in step 307 using the identity of the funding sources to find call detail records or other communication information associated with the funding source. In step 308, the other activities associated with the gang member funding sources are identified to the user. After step 308, the process may move to step 305 or any other point in the flowchart.

Figure 4:
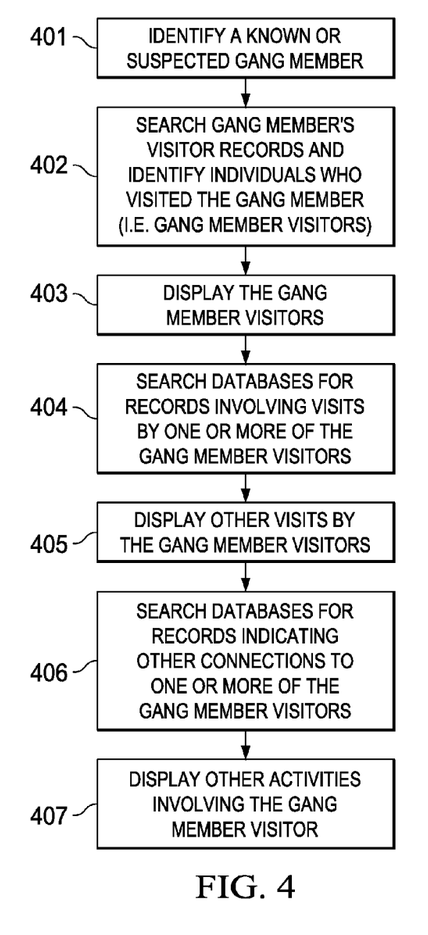
FIG. 4 illustrates a flowchart for another exemplary embodiment of a method for tracking, correlating, and reporting on communication and links between gang members and other individuals, such as common visitors.

FIG. 4 illustrates a flowchart for another exemplary embodiment of a method for tracking, correlating, and reporting on communication and links between gang members and other individuals, such as common visitors. The method illustrated in FIG. 4 may be implemented, for example, using investigation application 124 (FIG. 1), but is not intended to be limited to such configurations. Moreover, it will be understood that the steps illustrated in FIG. 4 may be performed in the order indicated, or in any other order, or simultaneously, or in conjunction with other steps or methods. In step 401, a known or suspected gang member is identified or selected by the user for processing. In step 402, the gang member's visitor records are searched to identify individuals who have visited the gang member. In step 403, the gang member visitors are displayed to the user, such as using an interface on terminals 125 or 126.

In step 404, selected databases are searched for records involving visits by one or more of the gang member's visitors to other prisoners, inmates or other detainees at the same or other facilities. In step 405, a list of the other visits by the gang member visitors is displayed to the user.

In step 406, selected databases are also searched for records indicating other connections to one or more of the gang member's visitors. For example, instead of limiting the search to other visits by an individual, any records stored in the selected databases may be searched for references to the individuals who have visited a designated gang member. Those other activities involving the gang member's visitors are displayed in step 407.

Figure 5:
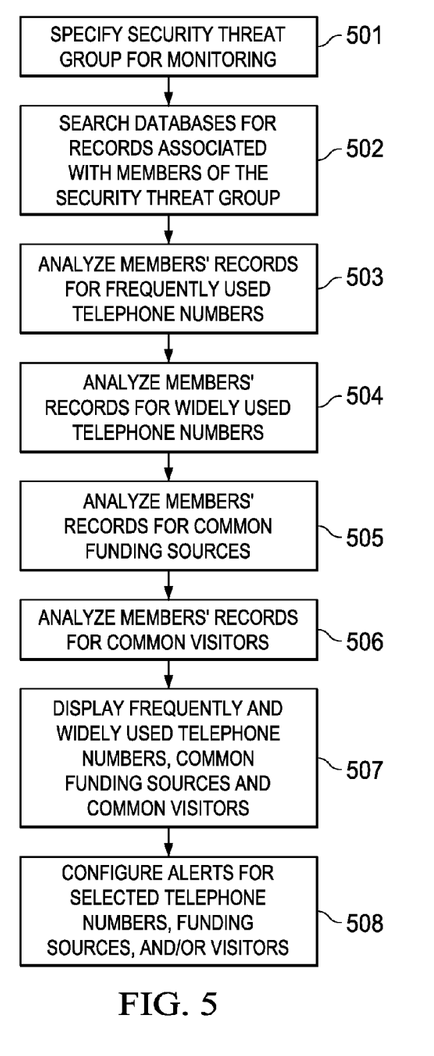
FIG. 5 illustrates a flowchart for another exemplary embodiment of a method for tracking, correlating, and reporting on communications and links between gang members and other individuals.

FIG. 5 illustrates a flowchart for another exemplary embodiment of a method for tracking, correlating, and reporting on communications and links between gang members and other individuals. The method illustrated in FIG. 5 may be implemented, for example, using investigation application 124 (FIG. 1), but is not intended to be limited to such configurations. Moreover, it will be understood that the steps illustrated in FIG. 5 may be performed in the order indicated, or in any other order, or simultaneously, or in conjunction with other steps or methods. In step 501, a gang or security threat group is selected for monitoring by a user, such as investigator. In step 502, all or selected databases are searched for records associated with members of the security threat group. In step 503, the members' records are analyzed to identify frequently used telephone numbers. The frequently used telephone numbers include, for example, a listing of telephone numbers called to or called by the members that is sorted to identify which numbers are called most often. In step 504, the members' records are analyzed to identify widely used telephone numbers, which include telephone numbers that are called to or called by the largest number of members, without regard to the overall volume of calls to or from the numbers. Identifying and sorting on widely used numbers would identify numbers that many members contact, which may designate the number as having a high priority for the investigator to further research.

In step 505, the members' records are analyzed to identify common funding sources; and in 506, the members' records are analyzed to identify common visitors. In step 507, frequently and widely used telephone numbers, common funding sources and common visitors may be displayed to the user. For example, the data may be displayed on terminal 125 or 126 using a GUI or text-based interface. The user may further sort the data based on selected member, telephone number, visitor, or other parameters.

Using the information collected in steps 502-507, the user may identify particular parameters, such as specific telephone numbers, funding sources, and/or visitors, that are of interest. In step 508, the user may configure alerts for selected telephone numbers, funding sources, and/or visitors. For example, the user may identify a particular individual for further tracking. Whenever a record associated with that individual is created or updated in a database, the investigation application may be configured to notify the user, such as by a telephone call to devices 127 or 128 or an email or text message to devices 128 or 129.

It will be understood that the user may configure alerts using any parameters available in the database records coupled to the investigation application. For example, the user may configure an alert so that a notification is sent when specific individuals communicate with each other, when a particular telephone number is called, when a particular commissary account is used or replenished, or when a particular source is used to fund a commissary account or to pay for a telephone call. Preferably, the format of the alert notification is configurable by the user to provide as much or as little information as desired. Email and text message notifications may be configured to provide detailed alert information to the user, including, for example, links to web pages or sites with further details regarding activity that triggered the alert. Alert notification messages directed to a telephone may be sent using an interactive voice response system, for example, that provides the user with options to request additional information regarding the activity. In one embodiment, the detainees' conversations are recorded, and the conversation that caused the alert notification may be played for the user. This would allow the user to receive an immediate notification when a selected individual made a call, or when two individuals of interest talk to each other. Additionally, the user would be able to listen to the conversation in real-time or near real-time or at a later time.

Figure 6:
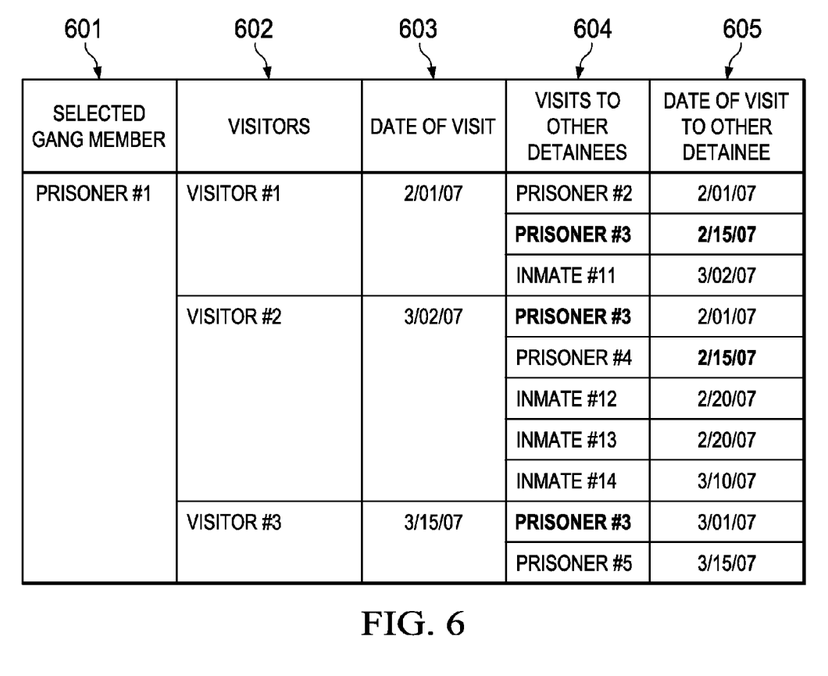
FIG. 6 illustrates a simplified version of a user interface for use with embodiments of the present invention.

FIG. 6 illustrates a simplified version of a user interface for use with embodiments of the present invention. The interface of FIG. 6 represents analysis and correlation of records based upon visitor record data for detainees. In column 601, Prisoner #1 has been selected as a person of interest because, for example, he is a member of a gang or security threat group. The visitor records for Prisoner #1 and/or the facility housing Prisoner #1 are searched to collect the visitor identification and date information, such as the data shown in columns 602 and 603. In column 602, the individuals who have visited Prisoner #1 are listed, and the dates of each visit are shown in column 603.

Using the present invention, further searching is performed to collect the data in columns 604 and 605. For each individual listed in column 602 who has visited Prisoner #1, a further second-level search has been conducted to identify other detainees who that individual visited. For example, Visitor #1 also visited Prisoners #3 and #4, who may be incarcerated at the same facility as Prisoner #1. Visitor #1 also visited Inmate #11, who may be incarcerated at a different facility. In one embodiment of the invention, multiple independent databases are searched for the second and subsequent searches so that records form different facilities may be correlated as shown in FIG. 6. The visitor analysis shown in FIG. 6 also lists Visitors #2 and #3 for Prisoner #1 in column 604 and lists the other detainees who were visited by Visitors #2 and #3 in column 605.

In one embodiment of the invention, an investigation application correlates and identifies when two or more visitors have visited with the same group of detainees. For example, in FIG. 6, it is apparent that each of Prisoners #1's visitors also visited Prisoner #3 at some other time. When reviewing the information presented in FIG. 6, an investigator may be further alerted to the fact that Visitors #1 and #2 visited Prisoner #3 on the same day. This information may suggest to the user that Prisoner #3 may be a member of the same gang or security threat group as Prisoner #1. The user may configure alerts in the system to be notified when other events occur that have a connection to both Prisoner #1 and #3. The user may also analyze additional information related to Prisoner #1 and #3, such as searching the databases for common funding sources or telephone numbers associated with both detainees. In other embodiments, an investigator may be notified when persons who are linked to selected detainees are identified as crossing a border, such as entering or leaving the United States.

Figure 7:
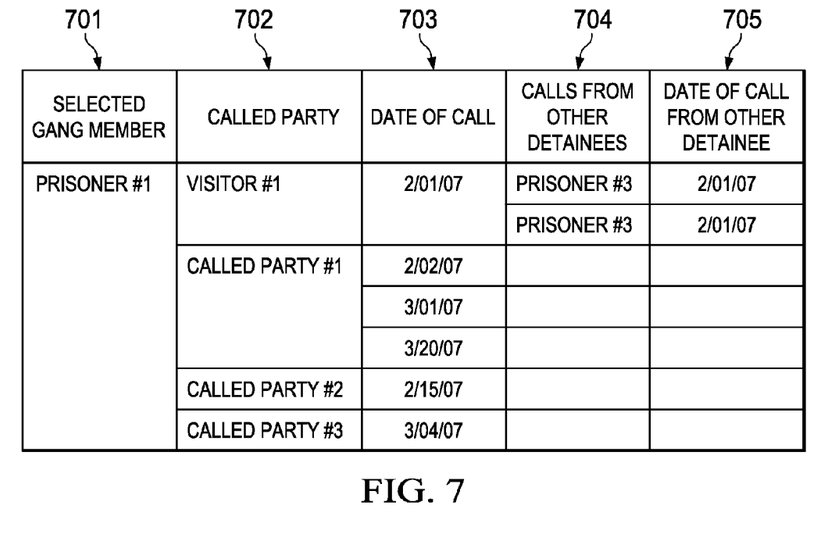
FIG. 7 illustrates another simplified version of a user interface for use with embodiments of the present invention.

FIG. 7 illustrates another simplified version of a user interface for use with embodiments of the present invention. The interface of FIG. 7 represents analysis and correlation of records based upon call record data for detainees. In column 701, Prisoner #1 has been selected. In column 702 and 703, individuals who were called by Prisoner #1 are listed along with date of the calls. The information in columns 702 and 703 may be collected, for example, from the call records or CDRs associated with the call management system for the facility where Prisoner #1 is incarcerated. In the example of FIG. 7, Prisoner #1 has called several people, including Visitor #1 of FIG. 6. Called Party #1 was called multiple times and the other individuals were called once in the selected period. It will be understood that the user may have the option of selecting certain times, dates, or other periods of interest for use in sorting gang member search data.

The investigation application further searches all or selected databases using the identities of the called parties in column 702 to collect the data displayed in columns 704 and 705. For example, all available call records, CDRs or other communication records may be searched using the names shown in column 702 to identify if they have communicated with other prisoners or detainees. As shown in FIG. 704, Visitor #1 also received calls from Prisoner #3. An investigator would not be aware of the potential connection between Prisoners #1 and #3 if they do not directly contact each other. However, using the second-level data collected by the investigation application the user may identify this connection. Because Prisoners #1 and #3 have common visitors and common called parties, they may be part of the same or related gangs organizations. An investigator may use the information shown in FIG. 7 to determine that the relation between Prisoners #1 and #3 should be further investigated.

Figure 8A:
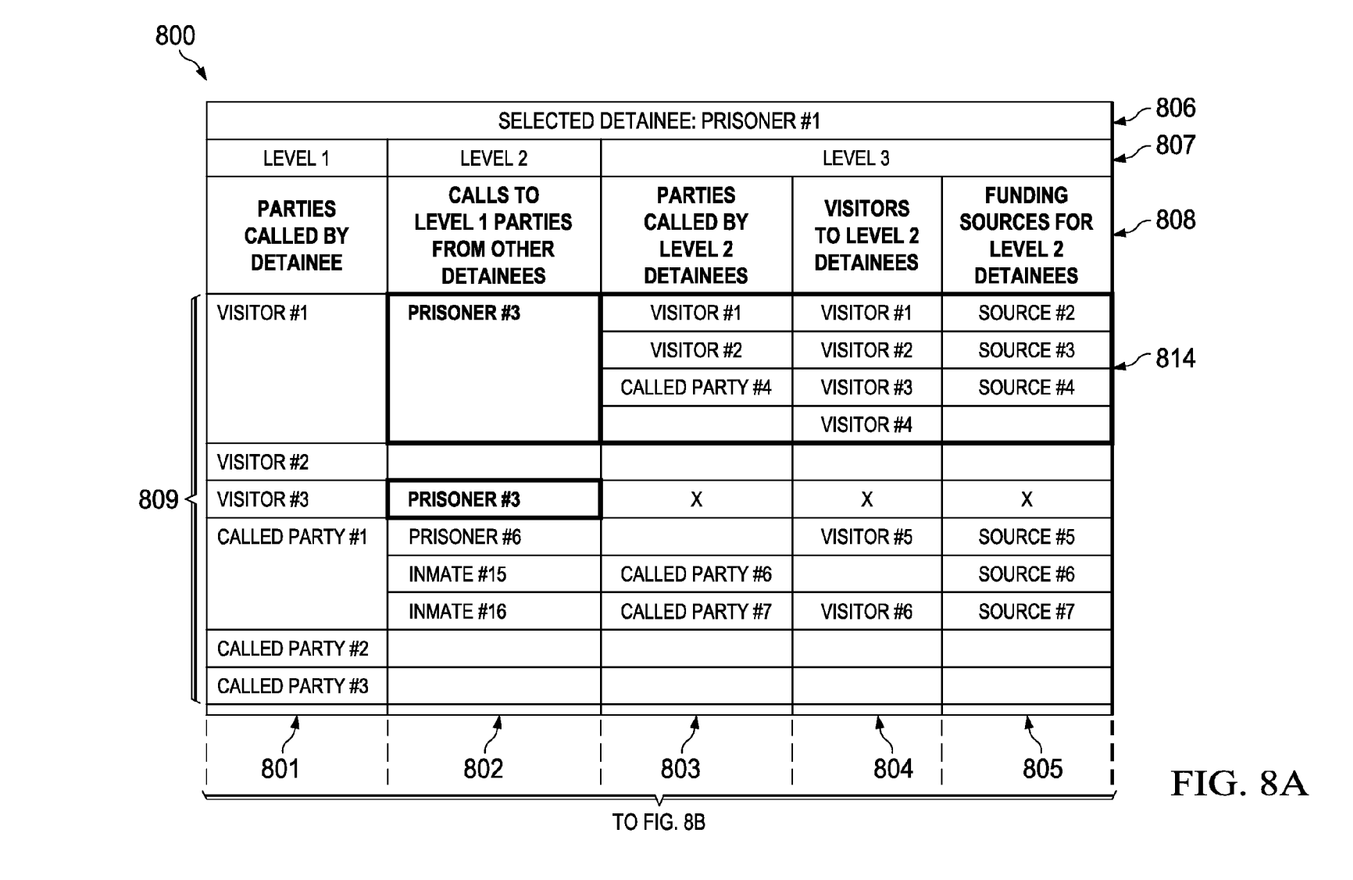
FIGS. 8A and 8B illustrate a user interface according to another embodiment of the invention.
Figure 8B:
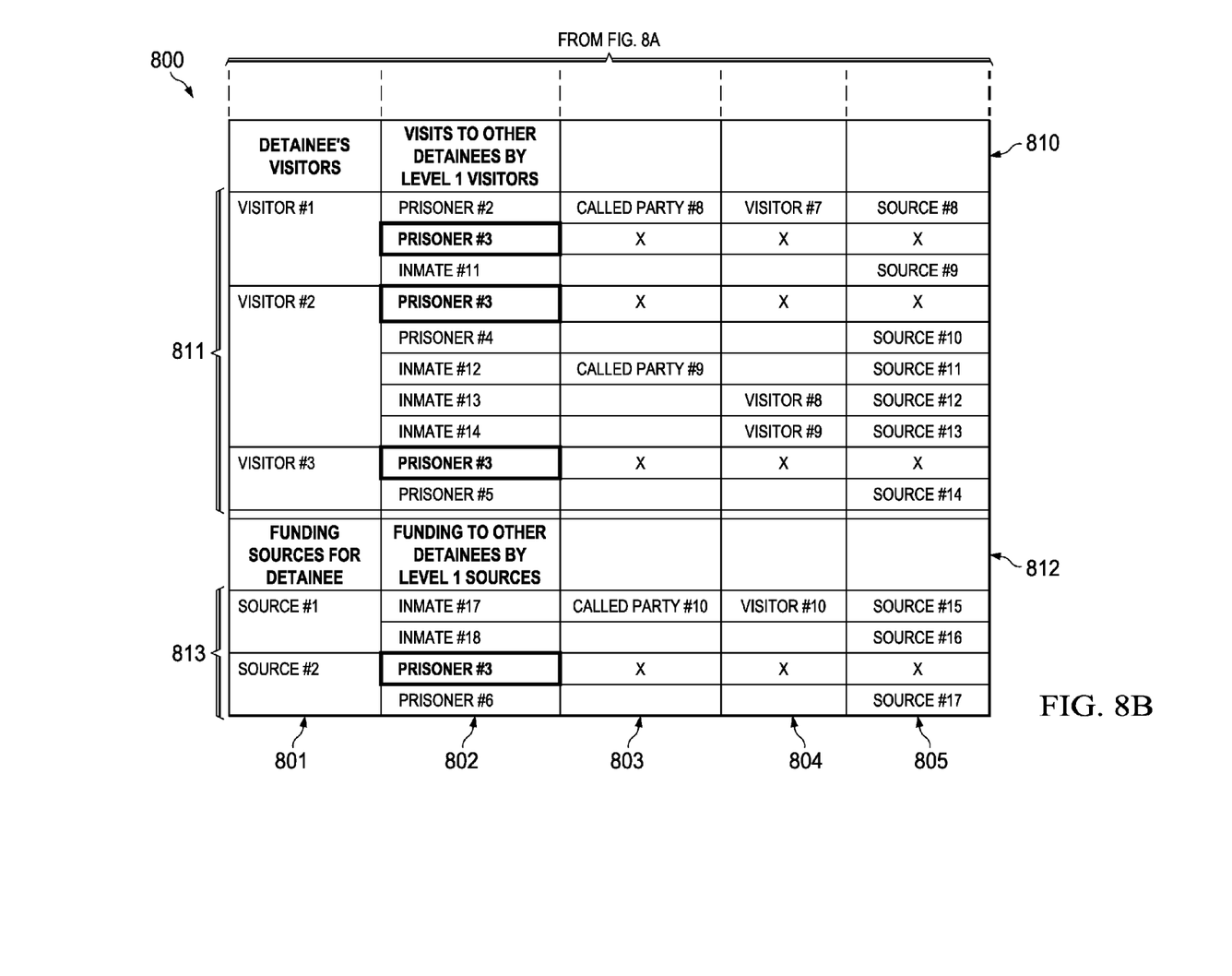

FIGS. 8A and 8B illustrates user interface 800 according to another embodiment of the invention. The interface shown in FIGS. 8A and 8B is simplified in order to facilitate the description of the invention. It will be understood that an interface used with other embodiments of the invention may have any number of selected fields and may present the information in any number of ways that are selected by the user or configured by a software designer.

Field 806 identifies a selected detainee, such as Prisoner #1. It will be understood that any prisoner identification may be used, such as a name, nickname, social security number, prisoner id number, or other unique identifier. Column 801 represents a first level 807 of data that is gathered by searching on records associated with Prisoner #1, the selected detainee. For example, the investigation application may search arrest records, jail records, call records, visitor records, commissary records, border crossing records or any other selected databases for Prisoner #1's records. Those records are then analyzed to identify parties called by Prisoner #1, such as those shown in section 809 of column 801. The records are further analyzed to identify Prisoner #1's visitors, such as those shown in section 811 of column 801. As illustrated in sections 809 and 811, Prisoner #1 was visited by Visitors #'s 1-3 and also called those individuals. Prisoner #1 also called Called Parties #'s 1-3. Finally, the records are analyzed to identify the source of funding for Prisoner #1's accounts, such as those listed in section 813 of column 801. This data listed in column 801 is gathered directly from Prisoner #1's own records. Sections 808, 810, and 812 may provide headings or other information to indicate the types of records or source of data that is presented in those sections.

Column 802 represents a second level 807 of data that is collected from records other than Prisoner #1's records. It will be understood that the user may select which databases should be searched to collect the second-level data. The records are searched using the identities of the parties in column 801, which were collected from Prisoner #1's data. The data collected in column 802 may be collected, for example, from call records that are searched for other entries listing the parties called by Prisoner #1 (section 809). These entries (listed in section 809 of column 802) represent other prisoners, inmates or other detainees who called the same people that were called by Prisoner #1.

Section 811 of column 802 represents a list or detainees who were visited by the same people who visited Prisoner #1. The data for section 811 in column 802 may be collected by searching visitor records in one or more databases using the parties that visited Prisoner #1 as search parameters. Finally, using the Prisoner #1's funding sources as search parameters, a list of other detainees who have been funded by the same sources as Prisoner #1 are listed in section 813 of column 802. If Prisoner #1 and the detainees listed in column 802 are calling the same people, being visited by the same people, and/or are funded by the same people, then those detainees may belong to the same gang or groups as Prisoner #1. The individuals listed in column 802 are one step removed from Prisoner #1 and may not have direct contact with Prisoner #1; however, by identifying contacts shared between detainees, the user may identify additional members of a gang or security threat group.

Sections 803-805 provide a third level 807 of data that is one more step removed from Prisoner #1, but which may assist the user to identify other detainees or non-detainees, such as visitors, called parties, or other individuals, who have common relationships with Prisoner #1. For example, call records for the detainees listed in column 802 may be searched to identify additional called parties that also share, directly or indirectly, a called party, visitor or funding source with Prisoner #1. Visitor records for the detainees listed in column 802 may be searched to identify additional visitors who share, directly or indirectly, a called party, visitor or funding source with Prisoner #1. Funding records, such as commissary accounts, for the detainees listed in column 802 may also be searched to identify additional funding sources that share, directly or indirectly, a called party, visitor or funding source with Prisoner #1.

The user interface may provide aides to the user to help identify detainees or other individuals who appear frequently in the searches. For example, Prisoner #3 shares visitor, called parties and funding sources with Prisoner #1 and, therefore, they may be members of the same gang or organization. Accordingly, any results listing Prisoner #3 may be highlighted, such as by bolded or italicized text, different colors, changes in font, or by circling the entry as shown in FIGS. 8A and 8B. Prisoner #3 may be a "third party" that has relationship with one or more of the same individuals known to Prisoner #1. There may be no direct connection to Prisoner #3, but the indirect connection may indicate other relationship, such as gang affiliations, witness affiliations, not known to the user. Prisoner #3 has been identified as a person of interest, Prisoner #3's contacts ("fourth party" contacts to Prisoner #1) may also be highlighted as shown in section 814. Of course, any other means of highlighting or otherwise calling attention to these contacts may be used based upon the user's and/or the designer's preference. In FIGS. 8A and 8B, for purposes of simplifying the example, an "X" is used wherein repeat entries would result for multiple appearances of Prisoner #3 in the second-level search results.

It will be understood that the user may select any of the listed detainees, visitors, called parties, funding sources, or other entities to request additional and/or more detailed data on the selected individual. For example, if the user selects Visitor #1, such as by "clicking" on the entry with a pointing device, then a list of detailed visitation records may be shown for Visitor #1, such as detainees visited, facilities visited, dates of visits, prior convictions, gang affiliations, and the like. Similarly, if a funding source is selected, detailed information regarding the funded accounts may be shown, such as detainees funded, dates of funding, amounts of deposits and the like. If a called party is selected, then detailed call records may be displayed, such as calling inmates, dates of calls, duration of calls, source of payment for calls, and the like.

As noted above, alerts or notifications may be configured using the investigation application. In one embodiment, a user may elect to monitor particular parameters associated with a known gang member, such as a number of visits, identify of visitors, number of deposits, amount of deposits, and source of deposits. The investigation application may provide a report on the selected parameters for the user's review and analysis. Alternatively, the user may configure alerts so that he is notified when certain events occur, such as when deposits over a specified amount are made, when calls to specific called parties are placed, or when particular types or amounts of purchase are made through the commissary system.

The user may select and configure rules-based criteria to set up alerts, reports and monitoring functions. In a preferred embodiment, the user may choose from any or a plurality of parameters to create notification alerts. The notifications may include a call, email, or other message sent to a user or investigator. In one embodiment, the alert system would notify the user in real-time of preselected activity. Alerts may also be sent other parties, such as a monitoring facility, supervisor, or operations center.

A rules-based engine may be configured so that if a specified criteria is met, then some alert or other action occurs. For example, an investigator may configure an alert using the rules-based engine so that (1) if a detainee having a certain gang affiliation or nationality, (2) calls or communicates with a specified individual or group, (3) then an alert is sent to the investigator and/or an agency. The present invention may be used, for example, by federal agencies, such as the United States Department of Homeland Security, to monitor and detect when particular individuals known or suspected to be terrorists communicate with each other.

The rules-based engine may be configured to monitor and alert on the content of live or recorded detainee conversations. For example, a word spotting application may be used to monitor the speech content of a telephone call for certain words. If a preselected word or phrase is detected, the word spotting application triggers an alert to the appropriate parties identified in the rule associated with the preselected word. In addition, a voice biometric match may trigger an alert. Alternatively, the content of a conversation or telephone call may be translated, transcribed or transliterated into spoken or written form in another language. The translated, transcribed or transliterated content may also be monitored for key words or phrases configured in the rules-based engine.

The rules based engine may be programmable and preferably include the capability to select a plurality of triggers and to identify particular relations of interest among those parameters.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for monitoring activity of detainees, comprising:
    identifying a detainee who is affiliated with a gang or correctional investigation;
    searching one or more databases for information associated with the detainee, wherein the one or more databases include call record databases, and wherein the information associated with the detainee includes individuals called by the detainee, individuals who visit the detainee, telephone numbers called by the detainee, and sources of funding for the detainee's accounts;
    correlating the information to identify individuals who may be affiliated with the gang or correctional investigation; and
    creating an alert that is triggered when a specified word, phrase or investigative event is detected during a telephone call by the detainee.

2. The method of claim 1, further comprising:
    creating an alert that is triggered when the detainee calls a specified telephone number.

3. The method of claim 1, further comprising:
    creating an alert that is triggered when a specified funding source is used.

4. The method of claim 1, further comprising:
    creating an alert that is triggered when the detainee calls a specified individual.

5. The method of claim 1, further comprising:
    notifying a user when a detainee calls a specified telephone number or a specified individual; and
    allowing the user to listen to the content of a detainee telephone call to the specified number or specified individual.

6. A method for monitoring activity of detainees, comprising:
    searching a first plurality of databases for a first level of information associated with a detainee known to be affiliated with a security threat group;
    searching a second plurality of databases using the first level of information to identify a second level of information;
    wherein the first and second plurality of databases include call record databases, and wherein the first and second levels of information associated with the detainee include individuals called by the detainee, individuals who visit the detainee, telephone numbers called by the detainee, and sources of funding for the detainee's accounts;
    correlating the second level of information to the detainee to identify other individuals affiliated with the security threat group; and
    creating an alert that is triggered when a specified word or phrase is detected during a telephone call by the detainee.

7. The method of claim 6, wherein the first level of information comprises a first group of one or more individuals who were called by the detainee; and
    wherein the second level of information comprises a second group of one or more individuals who were called by members of the first group.

8. The method of claim 6, wherein the first level of information comprises one or more telephone numbers that were called by the detainee; and
    wherein the second level of information comprises other detainees who called one or more of the telephone numbers that were called by the detainee.

9. The method of claim 6, wherein the first level of information comprises one or more funding sources that provided funds to detainee accounts; and
    wherein the second level of information comprises one or more other detainees having accounts that also received funds from one or more of the funding sources.

10. The method of claim 6, wherein the first level of information comprises a group of one or more individuals who visited the detainee; and
    wherein the second level of information comprises one or more other detainees who were visited by members of the first group.

11. The method of claim 6, wherein at least one of the databases in the second plurality of databases is also one of the databases in the first plurality of databases.

12. The method of claim 6, wherein the databases in the second plurality of databases are different from the databases in the first plurality of databases.

13. A method for monitoring activity of detainees, comprising:
searching first databases for a first level of information associated with a detainee known to be affiliated with a security threat group;
searching second databases using the first level of information to identify a second level of information;
searching third databases using the second level of information to identify a third level of information;
wherein the databases include call record databases, and wherein the levels of information include individuals called by the detainee, individuals who visit the detainee, telephone numbers called by the detainee, and sources of funding for the detainee's accounts; and
creating an alert that is triggered when a specified word or phrase is detected during a telephone call by the detainee.

14. A method of configuring an alert, comprising:
identifying one or more parameters associated with a detainee;
monitoring records comprising the one or more parameters;
wherein the records include call records, and wherein the parameters include individuals called by the detainee, individuals who visit the detainee, telephone numbers called by the detainee, and sources of funding for the detainee's accounts;
notifying a user upon activity involving at least one of the one or more parameters; and
creating an alert that is triggered when a specified word or phrase is detected during a telephone call by the detainee.

15. The method of claim 14, wherein the parameters comprise an individual or telephone number called by the detainee; and wherein the records comprise call records for the detainee.

16. The method of claim 14, wherein the parameters comprise a balance for one or more accounts assigned to the detainee; and wherein the activity comprises adding funds to at least one of the accounts.

17. The method of claim 16, wherein the added funds are associated with a preselected source.

* * * * *